J. P. ROSS.
Corn Mill.
No. 4,249. Patented Nov. 1, 1845.
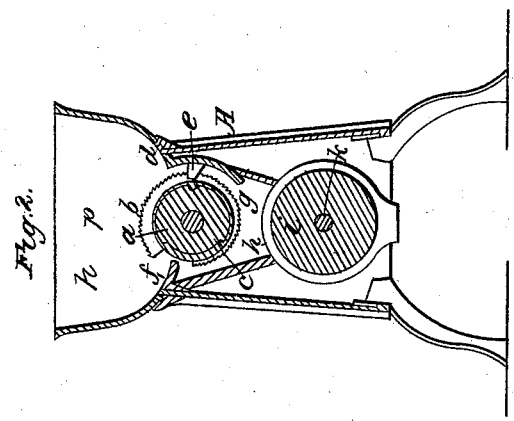
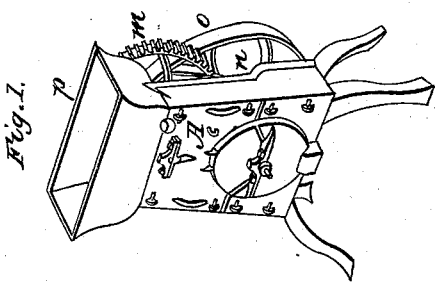
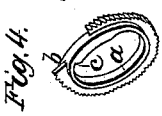

UNITED STATES PATENT OFFICE.

JAMES P. ROSS, OF LEWISBURG, PENNSYLVANIA.

MILL FOR CUTTING AND GRINDING CORN IN THE COB.

Specification of Letters Patent No. 4,249, dated November 1, 1845.

*To all whom it may concern:*

Be it known that I, JAMES P. ROSS, of Lewisburg, Union county, Pennsylvania, have invented a new and useful Mill for Cutting and Grinding Corn in the Ear, Applicable to other Grains and other Substances, and that the following is a full, clear, and exact description of the principle or character thereof which distinguishes it from all other things before known and of the manner of making, constructing, and using the same, reference being had to the accompanying drawings, which make part of this specification, in which—

Figure 1 is a perspective representation of the entire machine; Fig. 2, a transverse vertical section; Fig. 3, a side elevation of the cutting cylinder separately; and Fig. 4, a perspective representation of one of the cutting parts separate from the cylinder.

The same letters indicate like parts in all the figures.

The nature of my invention and what distinguishes it from all other things before known consists, in cutting the corn and cobs, &c., by a series of saw plates attached to a cylinder with their edges gradually increasing in diameter from one point to another on their peripheries whether they extend entirely around the cylinder or only over a portion of it, the spaces between these plates being such as to admit the teeth of a comb attached to, and projecting from what is termed the concave, and the plates of the cylinder being formed with teeth resembling saw teeth, on their outer edges, and if desired on the sides or faces also, so that an ear of corn can fall on to the comb from the hopper when the smallest diameter of the saw plates is toward the comb, and be cut by their continued revolution; and then when thus cut and reduced, carried down by a hopper or spout to a conical mill, of the usual construction, to be ground.

In the accompanying drawings (A) represents a frame adapted to all the moving parts of the mill and so shaped as to admit of molding that it may be made of cast iron, at very little expense, with very little weight, and very durable. (*a*) is the cylinder to which the saw plates (*b*, *b*) are attached; these are made with saw teeth on the outer edge, which is in the form of a segment of a volute, or may be of any other eccentric curve, and the inner periphery, or that which slips on to the included cylinder, provided with flanches (*c*, *c*) on each side by which to form the attachment to the cylinder; or they may be slipped on to the included cylinder with rings between them to form the spaces, as in the well known manner of making saw gins. The cylinder is provided with journals at each end running in appropriate boxes in the case, which need no description. The concave (*d*) is an iron plate which extends from a plane cutting the cylinder through its axis and horizontal and extending down around about one eighth of the circumference of the cylinder, and from near the upper part of this project the teeth (*e*) of the comb; their length should be in proportion to the projection of the saw plates from the cylinder, so that their points shall just clear the cylinder, and their thickness a little less than the space between the saw plates, and their depth such as to give the requisite strength, but greater at their junction with the concave than toward the points. For each machine there are several concave plates each made with the comb at greater distance from the upper edge, as this distance regulates the quantity of corn, &c., submitted to the action of the saws at each operation, so that by changing the concave and comb the capacity of the machine can be varied at pleasure. On the opposite side of the cylinder there is another comb (*f*) of teeth corresponding with the one described, but which may be of less strength, as the only object of it is to prevent the corn, &c. from falling through when the smallest diameter of the saw plates, in their rotation, pass on that side. From the concave and cylinder a spout (*g*) is formed which extends down to the small end of a conical grinder (*h*), constructed in the usual manner, and consisting of the conical nut (*i*) or grinder on a horizontal shaft (*k*) and working in the concave (*h*) of corresponding form. The nut of this grinder is provided with a temper screw (*l*) which passes through the frame and bears against the shaft or spindle of the nut to regulate the quality of grinding. The cutting cylinder and conical grinder are geared together by cog wheels (*m*) (one only being visible) on their shafts or spindles, and the whole is carried by a band from some first mover running on to the pulley (*o*) on the shaft of the conical grinder. A hopper (p) is provided at the top to supply the cutting cylinder with corn, or any other substance desired to be operated on.

It will be obvious that the form of the saw plates may be varied from a segment of a volute, provided they increase in diameter from one point to another, as for instance, instead of the increase of diameter extending entirely around the cylinder, it may extend over a portion of the circumference of the cylinder, and instead of one set there may be two or more. The teeth may, if desired, extend along the sides of the plates, and corresponding teeth may be made on the sides of the comb teeth; but all these are unimportant details which may be varied so long as the principle pointed out above is retained, and Therefore what I claim as my invention and desire to secure by Letters Patent is, 1. The series of eccentric or irregular saw plates on the cylinder in combination with the comb for the purpose of cutting corn in the ear, or other substance, substantially as herein described; and in combination therewith.

2. I also claim the conical mill for grinding the grain &c. after being cut, substantially as herein described.

J. P. ROSS.

Witnesses:
CHAS. M. KELLER,
J. J. GREENOUGH.